United States Patent
Song et al.

(10) Patent No.: US 8,599,908 B2
(45) Date of Patent: Dec. 3, 2013

(54) MODEM FOR NETWORK SYSTEM AND OPERATING METHOD THEREOF

(75) Inventors: Min Jin Song, Seoul (KR); Myung Sik Kim, Suwon-si (KR); Jae Yu Seo, Suwon-si (KR); Hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/408,075

(22) Filed: Feb. 29, 2012

(65) Prior Publication Data

US 2012/0230378 A1  Sep. 13, 2012

(30) Foreign Application Priority Data

Mar. 11, 2011  (KR) ........................ 10-2011-0022017

(51) Int. Cl.
*H04B 1/38*   (2006.01)
(52) U.S. Cl.
USPC ........... 375/222; 375/220; 375/295; 375/316; 455/39; 455/91; 455/130; 370/360; 370/389; 370/392

(58) Field of Classification Search
USPC .............. 375/220, 222, 295, 316; 455/39, 91, 455/130; 370/360, 389, 392
See application file for complete search history.

(56) References Cited

U.S. PATENT DOCUMENTS

2008/0044006 A1* 2/2008 Kitagawa ................. 379/433.01
2009/0017772 A1* 1/2009 Kemmochi et al. ............. 455/73

* cited by examiner

*Primary Examiner* — Leon Flores
(74) *Attorney, Agent, or Firm* — Staas & Halsey LLP

(57) ABSTRACT

A modem for network system which is mounted in an electric home appliance to communicate with an external service device, to which an additional modem may be connected, and to which one or more electric home appliances may be connected and an operating method thereof. The modem has a plurality of input/output ports, functions of which are changed using a switch so that an additional modem or an electric home appliance is connected to the modem. When two modems using the same interface are connected to an electric home appliance, connection of the modems to the electric home appliance is easily achieved via the existing ports without adding a new input/output interface to the electric home appliance. Also, when one or more electric home appliances jointly use a modem, additional connection of the electric home appliances is achieved using a switch without using an additional distributor.

23 Claims, 11 Drawing Sheets

MODEM FOR NETWORK SYSTEM AND OPERATING METHOD THEREOF

CROSS-REFERENCE TO RELATED APPLICATIONS

This application claims the benefit of Korean Patent Application No. 2011-0022017, filed on Mar. 11, 2011 in the Korean Intellectual Property Office, the disclosure of which is incorporated herein by reference.

BACKGROUND

1. Field

Embodiments of the present disclosure relate to a modem for a network system which is mounted in an electric home appliance to communicate with an external service device and an operating method thereof.

2. Description of the Related Art

As the digital age advances, high-speed digital electric home appliances for high speed and capacity transmission have been mounted in houses or buildings. As a result, a network has been constructed among the electric home appliances and systems to integrally manage such a network have been developed.

In a recent network system, a plurality of electric home appliances are connected to an external service device, which integrally manages the electric home appliances, via a network constructed in a building to perform data transmission and reception there between.

Such a network system includes a modem configured so that data is wirelessly transmitted and received between an electric home appliance and an external service device via the network.

Generally, a modem is connected to an electric home appliance via a physical input/output interface and the electric home appliance communicates with an external service device via the physical input/output interface.

When an additional modem is to be connected to the electric home appliance communicating with the external service device via the modem, it may be necessary to add a new input/output interface. When the electric home appliance is not provided with an additional input/output interface, however, it may not be possible to connect an additional modem.

Also, when one or more electric home appliances are to be connected to a modem, the electric home appliances may not jointly use the modem with the result that it may be necessary to use an additional distributor.

SUMMARY

It is an aspect of the present disclosure to provide a modem for a network system configured such that an electric home appliance uses two modems having the same interface and one or more electric home appliances jointly use a modem without using an additional distributor and an operating method thereof.

Additional aspects of the disclosure will be set forth in part in the description which follows and, in part, will be apparent from the description, or may be learned by practice of the disclosure.

In accordance with an aspect of the present disclosure, a modem for a network system includes an antenna to wirelessly transmit and receive data, a plurality of input/output ports to function as an input or output port to communicate with an external service device via the antenna, a switch to change functions of the input/output ports so that the input/output ports function as the input or output port and a controller to control the modem to communicate with the external service device via a communication channel connected to the antenna and the input/output ports when the functions of the input/output ports are changed by the switch.

The modem may be connected to an electric home appliance and communicate with the external service device.

The modem may be connected to an additional modem and communicate with the external service device.

The modem may be connected to one or more electric home appliances and communicate with the external service device.

The input/output ports may include a first port, which is an exclusive output port, and a second port, which is changed into an input or output port by the switch.

The first port may be connected to the electric home appliance to define a communication channel between the electric home appliance and the external service device.

The second port may be connected to the one or more electric home appliances to define a communication channel between the one or more electric home appliances and the external service device.

The switch may change a function of the second port into an output port when the second port is connected to the one or more electric home appliances.

The second port may be connected to the additional modem to define a communication channel between the additional modem and the external service device.

The switch may change a function of the second port into an input port when the second port is connected to the additional modem.

The modem may be connected to the one or more electric home appliances or the additional modem.

The modem may communicate with the external service device via a wireless network such as a ZigBee network, a WiFi network, a Bluetooth network or a mobile network.

In accordance with another aspect of the present disclosure, an operating method of a modem mounted in one or more electric home appliances connected to a wireless network to communicate with an external service device includes communicating with the external service device via a plurality of input/output ports to function as an input or output port, changing functions of the input/output ports so that the input/output ports function as the input or output port and communicating with the external service device via a communication channel connected to the input/output ports when the functions of the input/output ports are changed.

The modem may be connected to the one or more electric home appliances or an additional modem.

The modem may create a communication data packet containing information on one or more destinations, information on one or more stopovers and information on a sender when the modem is connected to the one or more electric home appliances.

The information on one or more destinations and the information on one or more stopovers may include information on all electric home appliances and specific electric home appliances or essential electric home appliances.

The modem, connected to the one or more electric home appliances, may recognize kinds and serial numbers of the electric home appliances and use the recognized information to set the communication channel.

The one or more electric home appliances, connected to the modem, may recognize a kind and serial number of the modem and use the recognized information to set the communication channel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
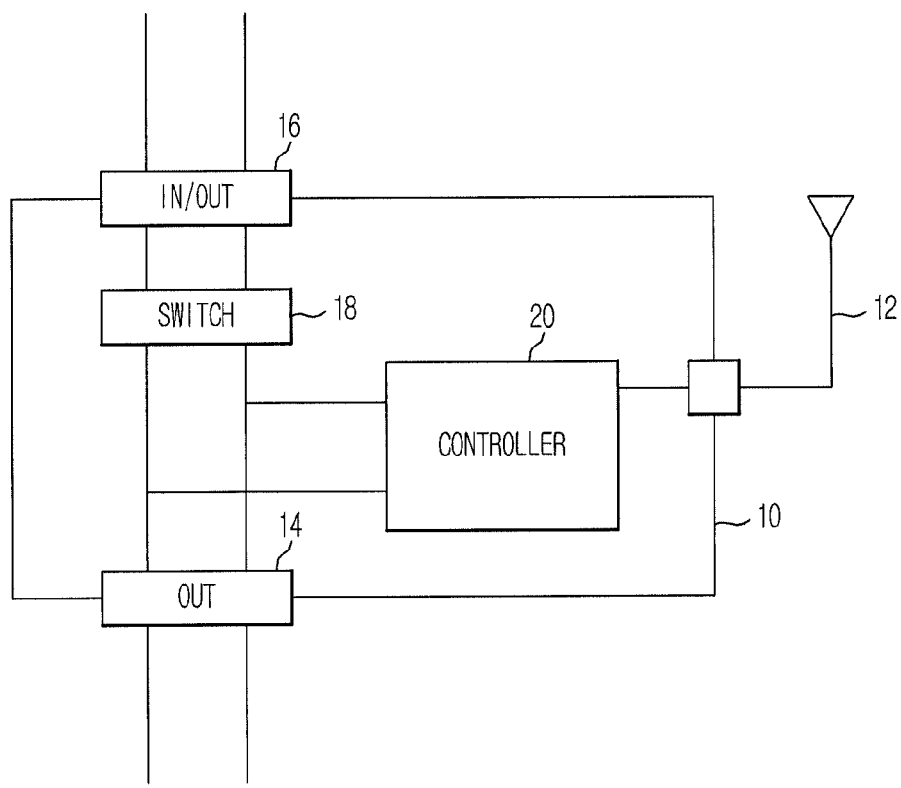
FIG. 1 is a view showing the construction of a modem for a network system according to an embodiment of the present disclosure.

Reference will now be made in detail to the embodiments of the present disclosure, examples of which are illustrated in the accompanying drawings, wherein like reference numerals refer to like elements throughout.

FIG. 1 is a view showing the construction of a modem for a network system according to an embodiment of the present disclosure.

Referring to FIG. 1, the modem 10 is mounted in an electric home appliance 30 to communicate with an external service device. The modem 10 includes an antenna 12, a first port 14, a second port 16, a switch 18 and a controller 20. The modem 10 may be an internal or external modem.

The antenna 12 wirelessly transmits and receives data to and from the external service device via a wireless network such as a ZigBee network, a WiFi network, a Bluetooth network or a mobile network.

That is, the antenna 12 converts data received from the controller 20 into a radio frequency signal, which is transmitted to the external service device. Also, the antenna 12 converts a radio frequency signal received from the external service device into data, which is transmitted to the controller 20.

In other words, the antenna 12 defines a path with a transmitting channel Tx upon transmitting a radio frequency signal and a path with a receiving channel Rx upon receiving the radio frequency signal to transmit and receive the radio frequency signal.

The first port 14 and the second port 16 are input/output ports, connected to an electric home appliance 30 or an additional modem 40, having a receiving channel Rx to transmit data received from the external service device via the antenna 12 to the electric home appliance 30 and a transmitting channel Tx to transmit data processed by the electric home appliance 30 to the external service device via the antenna 12.

Also, the first port 14 and the second port 16 may function as input or output ports according to manipulation of the switch 18.

One of the first and second ports 14 and 16 may be used as an exclusive output port. For example, when the first port 14 is an exclusive output port, the second port 16 may be used as an input/output port. When the second port 16 is an exclusive output port, the first port 14 may be used as an input/output port.

In the following description, the first port 14 is an exclusive output port and the second port 16 is as an input/output port for easy understanding.

The first port 14 is an exclusive output port connected to the electric home appliance 30, which communicates with the external service device. The first port 14 has a receiving channel Rx to transmit data received from the external service device via the antenna 12 to the electric home appliance 30 and a transmitting channel Tx to transmit data processed by the electric home appliance 30 to the external service device via the antenna 12.

The second port 16 is an input/output port, which may be connected to an additional modem 40 except the electric home appliance 30 connected to the modem 10 via the first port 14. The second port 16 may function as an input port to transmit data received from the external service device via an antenna 42 of the additional modem 40 to the electric home appliance 30.

Therefore, the second port 16, functioning as the input port, has a receiving channel Rx to transmit data received from the external service device via the antenna 42 of the additional modem 40 to the electric home appliance 30 and a transmitting channel Tx to transmit data processed by the electric home appliance 30 to the external service device via the antenna 42 of the additional modem 40.

Also, the second port 16 is an input/output port, which may be connected to another electric home appliance 50 except the electric home appliance 30 connected to the modem 10 via the first port 14. The second port 16 may function as an output port to transmit data received from the external service device via the antenna 12 to the electric home appliance 50.

Therefore, the second port 16, functioning as the output port, has a receiving channel Rx to transmit data received from the external service device via the antenna 12 to the electric home appliance 50 and a transmitting channel Tx to transmit data processed by the electric home appliance 50 to the external service device via the antenna 12.

The switch 18 changes the function of the second port 16 into an input or output port.

For example, when the second port 16 is to be connected to the additional modem 40, the switch 18 changes the function of the second port 16 into an input port. Therefore, the second port 16 defines a communication channel to transmit data received from the external service device via the antenna of the additional modem 40 to the electric home appliance 30 and to transmit data processed by the electric home appliance 30 to the additional modem 40.

On the other hand, when the second port 16 is to be connected to the electric home appliance 50, the switch 18 changes the function of the second port 16 into an output port. Therefore, the second port 16 defines a communication channel to transmit data received from the external service device via the antenna 12 of the modem 10 to the electric home appliance 50 and to transmit data processed by the electric home appliance 50 to the modem 10.

The controller 20 sets transmitting and receiving channels of data received from the external service device via the antenna 12 and controls data to be transmitted and received between the electric home appliance 30 and the external service device via the transmitting and receiving channels set according to data received from the electric home appliance 30.

Also, the controller 20 performs a control operation so that the transmitting channel Tx and the antenna 12 defines a path upon transmitting a radio frequency signal and the receiving channel Rx and the antenna 12 defines a path upon receiving the radio frequency signal to transmit and receive the radio frequency signal.

Also, the controller 20 is a microprocessor to control the operation of the modem 10 or to monitor the state of the modem 10. The controller 20 perform a control operation so that data received from the external service device via the antenna 12 is transmitted to the electric home appliance 30 and data processed by the electric home appliance 30 is transmitted to the external service device via the antenna 12.

In addition, when the function of the second port 16 is changed according to manipulation of the switch 18, the controller 20 controls the additional modem 40 or the electric home appliance 50 to communicate with the external service device via the second port 16.

Meanwhile, the external service device, which may integrally manage one or more electric home appliances 30 and 50 via a wireless network, is connected to the electric home appliances 30 and 50 to control the operation of the electric home appliances 30 and 50 or to monitor the state of the electric home appliances 30 and 50. The external service device includes a home server to centrally control the electric home appliances 30 and 50 and a smart meter configured to receive information related to the power rate from an electric power company and to integrally manage power consumed by the electric home appliances 30 and 50.

The electric home appliances 30 and 50 are network products connected to a wireless network constructed in a house or building. The electric home appliances 30 and 50 may include washing machines, refrigerators, microwave ovens and gas alarm devices.

Figure 2:
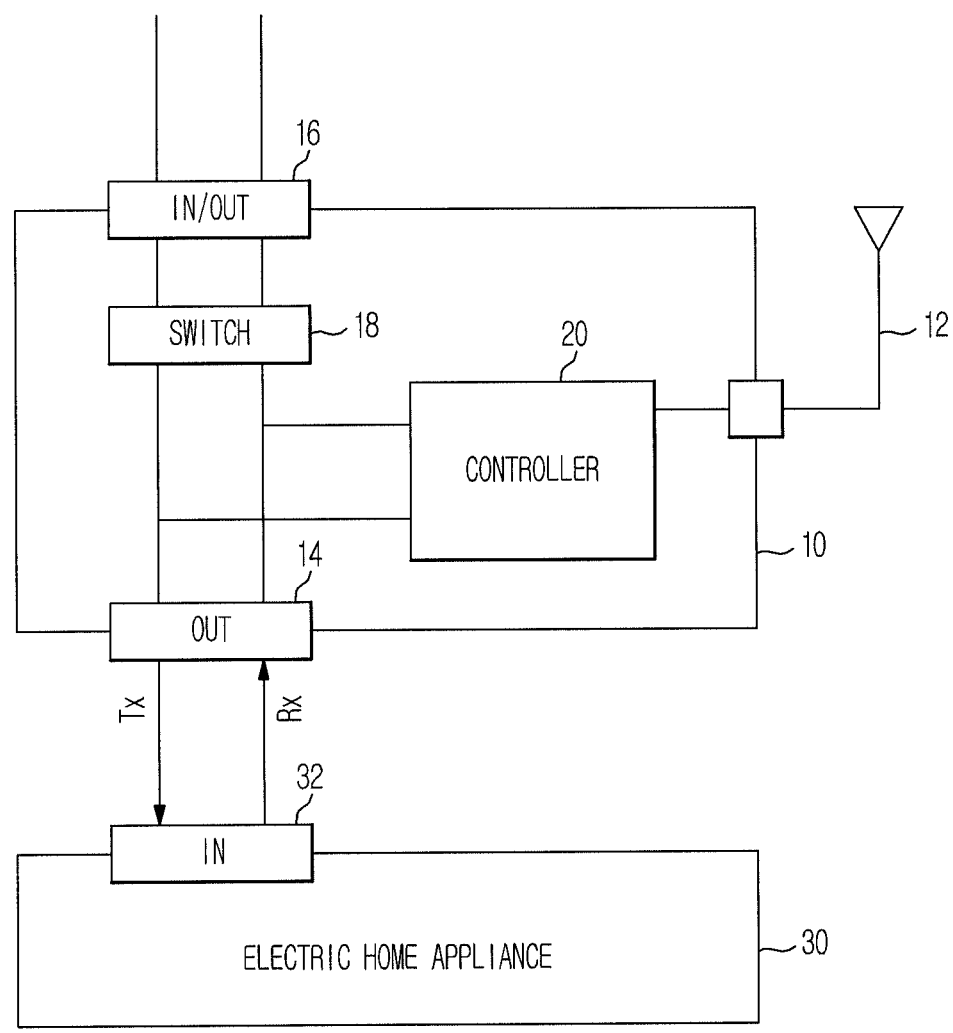
FIG. 2 is a view showing an electric home appliance connected to the modem for the network system according to the embodiment of the present disclosure.

FIG. 2 is a view showing an electric home appliance connected to the modem for the network system according to the embodiment of the present disclosure.

Referring to FIG. 2, an input port 32 of the electric home appliance 30 is connected to the first port 14 of the modem 10. In this case, the modem 10 uses the first port 14 alone.

When the input port 32 of the electric home appliance 30 is connected to the first port 14 of the modem 10, the controller 20 of the modem 10 transmits data received from the external service device via the antenna 12 to the electric home appliance 30 via the first port 14 of the modem 10 and the input port 32 of the electric home appliance 30.

Subsequently, data processed by the electric home appliance 30 is transmitted in reverse order. That is, data is transmitted to the controller 20 of the modem 10 via the first port 14 of the modem 10 and to the external service device via the antenna 12.

In this way, the modem 10 transmits data received from the external service device via the antenna 12 to the electric home appliance 30 via the first port 14, receives data processed by the electric home appliance 30 via the first port 12 and transmits the data to the external service device via the antenna 12.

Communication between the electric home appliance 30 and the external service device is achieved via such a communication channel.

Figure 3:
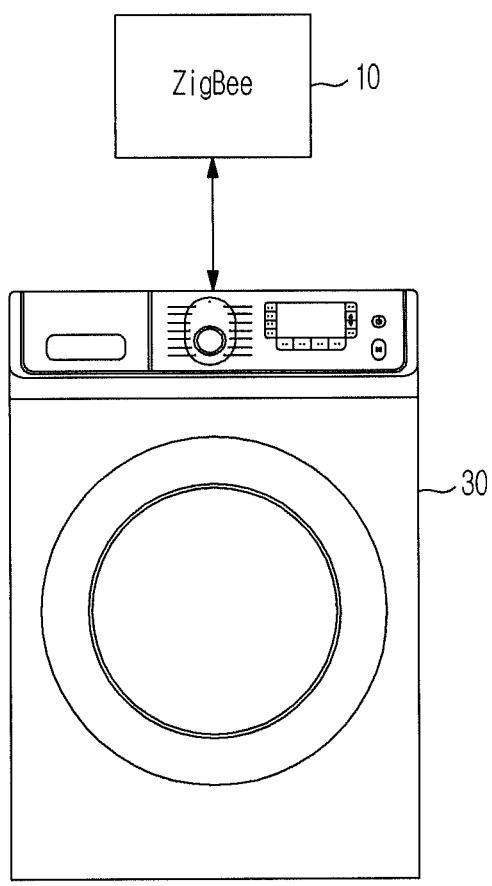
FIG. 3 is a view showing a product application example of FIG. 2.

FIG. 3 is a view showing a product application example of FIG. 2.

Referring to FIG. 3, an external modem using a ZigBee network is used as the modem 10 and a washing machine is used as the electric home appliance 30.

Figure 4:
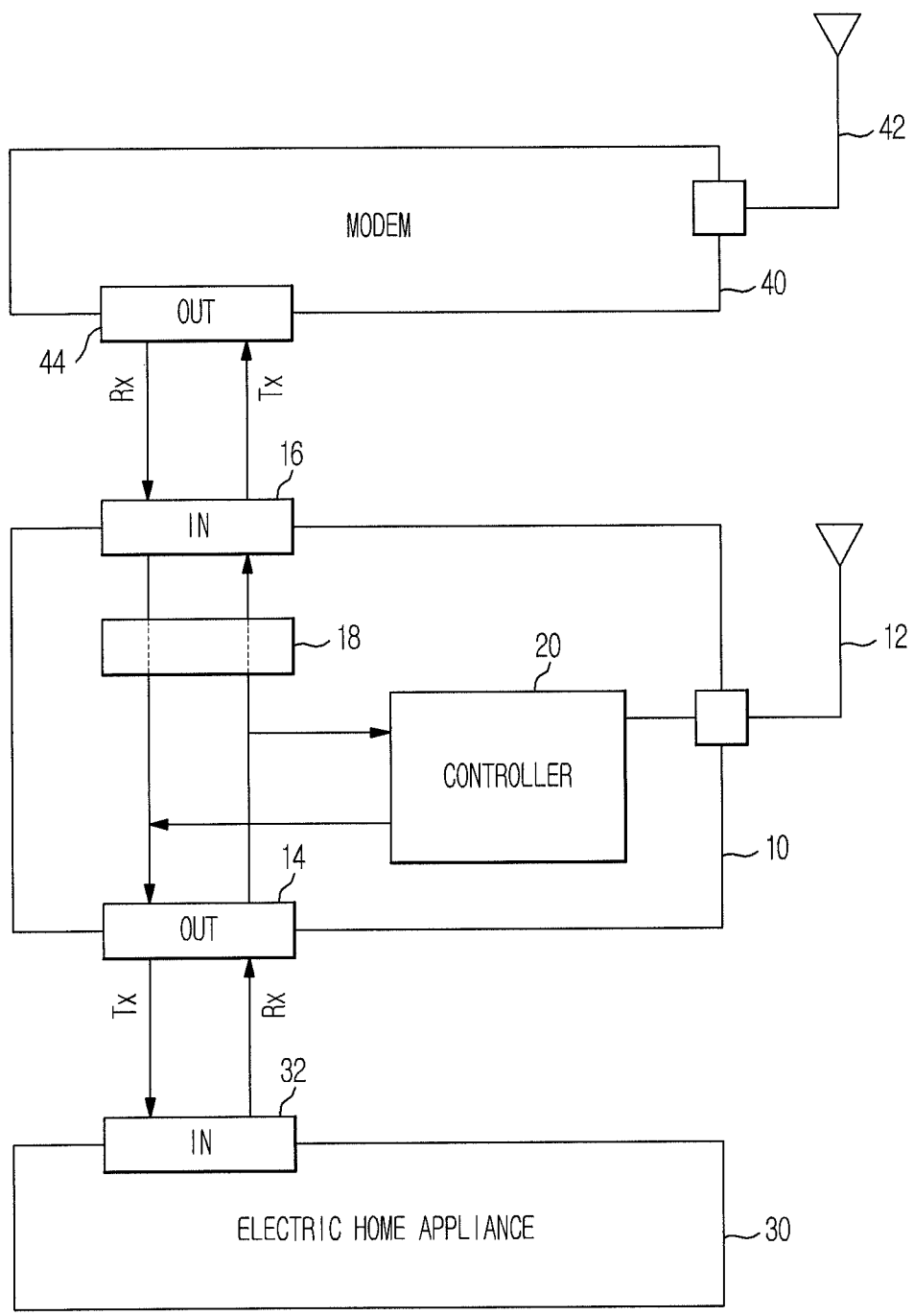
FIG. 4 is a view showing an additional modem connected to the modem for the network system according to the embodiment of the present disclosure.

FIG. 4 is a view showing an additional modem connected to the modem for the network system according to the embodiment of the present disclosure.

Referring to FIG. 4, the input port 32 of the electric home appliance 30 is connected to the first port 14 of the modem 10 and an output port 44 of the additional modem 40 is connected to the second port 16 of the modem 10. In this case, the modem 10 uses both the first port 14 and second port 16.

When the additional modem 40 is to be connected to the second port 16 of the modem 10, a user changes the function of the second port 16 into an input port using the switch 18.

Consequently, data received from the external service device via an antenna 42 of the additional modem 40 is transmitted to the electric home appliance 30, where the data is processed, via an output port 44 of the additional modem 40, the second port 16 of the modem 10, the first port 14 of the modem 10 and the input port 32 of the electric home appliance 30.

Subsequently, data processed by the electric home appliance 30 is transmitted in reverse order. That is, data is transmitted to a controller (not shown) of the additional modem 40 via the input port 32 of the electric home appliance 30, the first port 14 of the modem 10, the second port 16 of the modem 10 and the output port 44 of the additional modem 40 and to the external service device via the antenna 42 of the additional modem 40.

In this way, the modem 10 defines a communication channel in which data received from the external service device via the antenna 42 of the additional modem 40 is transmitted to the electric home appliance 30 via the output port 44 of the additional modem 40, the second port 16 of the modem 10, the first port 14 of the modem 10 and data processed by the electric home appliance 30 is received via the first port 14 and the second port 16 of the modem 10 and the output port 44 of the additional modem 40 and transmitted to the external service device via the antenna 42 of the additional modem 40.

Communication between the electric home appliance 30 and the external service device is achieved via such a communication channel.

Meanwhile, data processed by the electric home appliance 30 may not be transmitted to the additional modem 40 but to the controller 20 of the modem 10 via the first port 14 of the modem 10 and to the external service device via the antenna 12 of the modem 10.

Therefore, connection of two modems 10 and 40 to an electric home appliance 30 is easily achieved via the existing input port 32 without adding a new input/output interface to the electric home appliance 30. As a result, two modems 10 and 40 using the same interface are connected to an electric home appliance 30, whereby a user may conveniently achieve additional connection of the modems 10 and 40.

Figure 5:
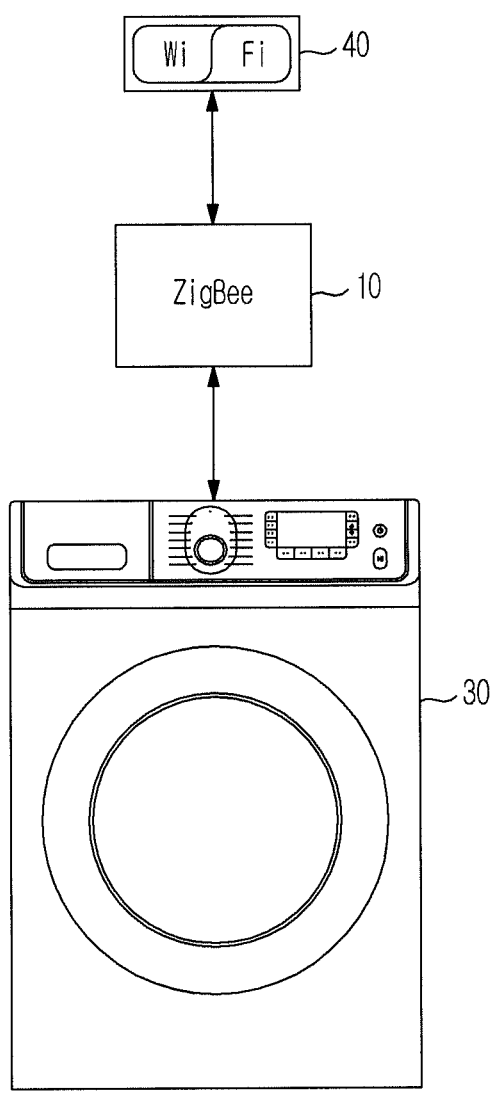
FIG. 5 is a view showing a product application example of FIG. 4.

FIG. 5 is a view showing a product application example of FIG. 4.

Referring to FIG. 5, an external modem using a ZigBee network is used as the modem 10, an external modem using a WiFi network is used as the additional modem 40 and a washing machine is used as the electric home appliance 30.

Figure 6:
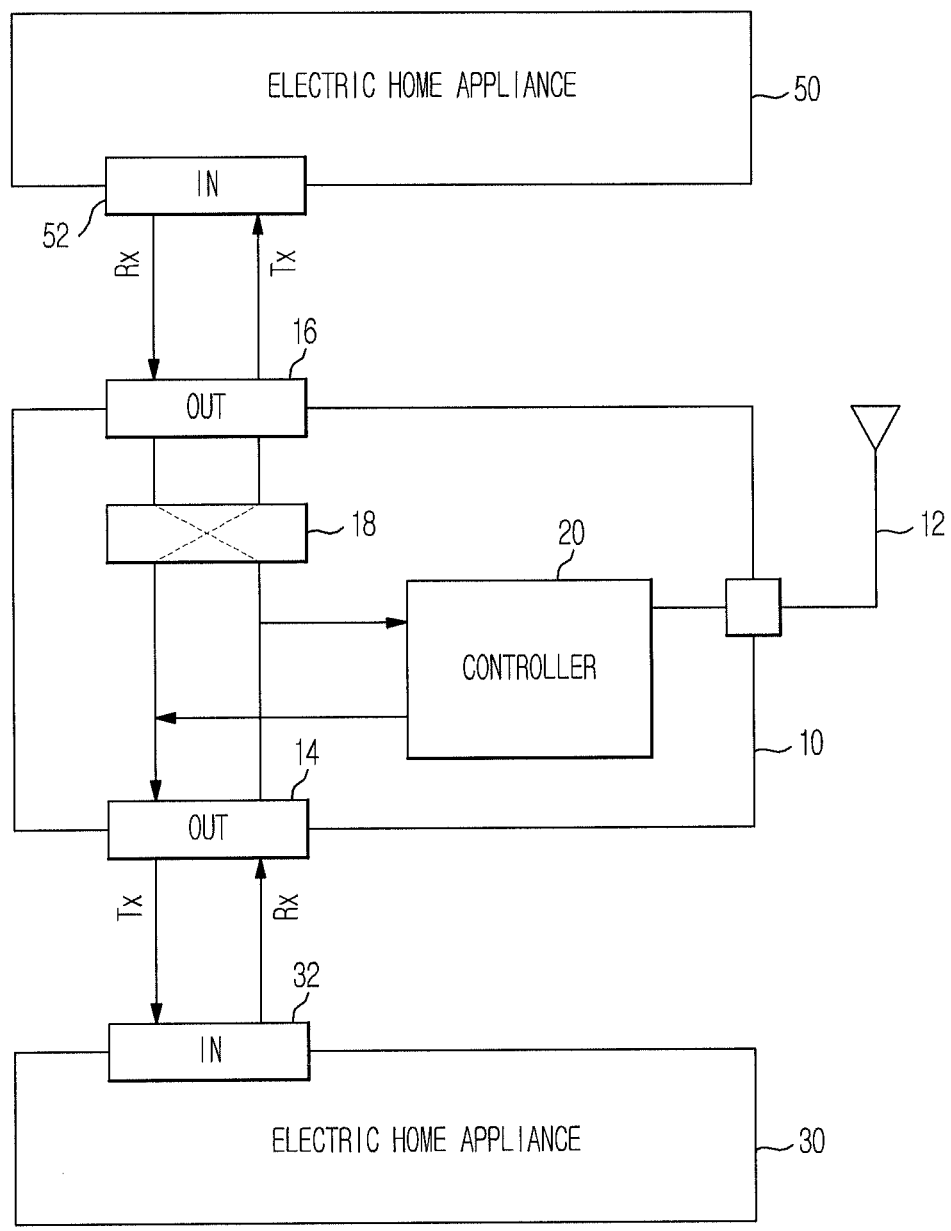
FIG. 6 is a view showing one or more electric home appliances connected to the modem for the network system according to the embodiment of the present disclosure.

FIG. 6 is a view showing one or more electric home appliances connected to the modem for the network system according to the embodiment of the present disclosure.

Referring to FIG. 6, the input port 32 of the electric home appliance 30 is connected to the first port 14 of the modem 10 and an input port 52 of another electric home appliance 50 is connected to the second port 16 of the modem 10. In this case, the modem 10 uses both the first port 14 and second port 16.

When the electric home appliance 50 is to be connected to the second port 16 of the modem 10, a user changes the function of the second port 16 into an output port using the switch 18.

Consequently, the controller 20 of the modem 10 transmits data received from the external service device via the antenna 12 to the electric home appliance 30 via the first port 14 of the modem 10 and the input port 32 of the electric home appliance 30 and to the electric home appliance 50 via the second port 16 of the modem 10 and the input port 52 of the electric home appliance 50.

Subsequently, data processed by the electric home appliances 30 and 50 is transmitted in reverse order. That is, data is transmitted to the controller 20 of the modem 10 via the input port 32 of the electric home appliance 30 and the first port 14 of the modem 10 and is transmitted to the controller 20 of the modem 10 via the input port 52 of the electric home appliance 50 and the second port 16 of the modem 10 and to the external service device via the antenna 12.

In this way, the modem 10 defines a communication channel in which data received from the external service device via the antenna 12 is transmitted to the electric home appliances 30 and 50 via the first port 14 and the second port 16 and data processed by the electric home appliances 30 and 50 is received via the first port 14 and the second port 16 and transmitted to the external service device via the antenna 12.

Communication between the electric home appliance 30 and the external service device is achieved via such a communication channel.

When a modem 10 is connected to two electric home appliances 30 and 50, therefore, the electric home appliances 30 and 50 jointly use the modem 10 without using an additional distributor, whereby a user may conveniently achieve additional connection of the electric home appliances 30 and 50.

Figure 7:
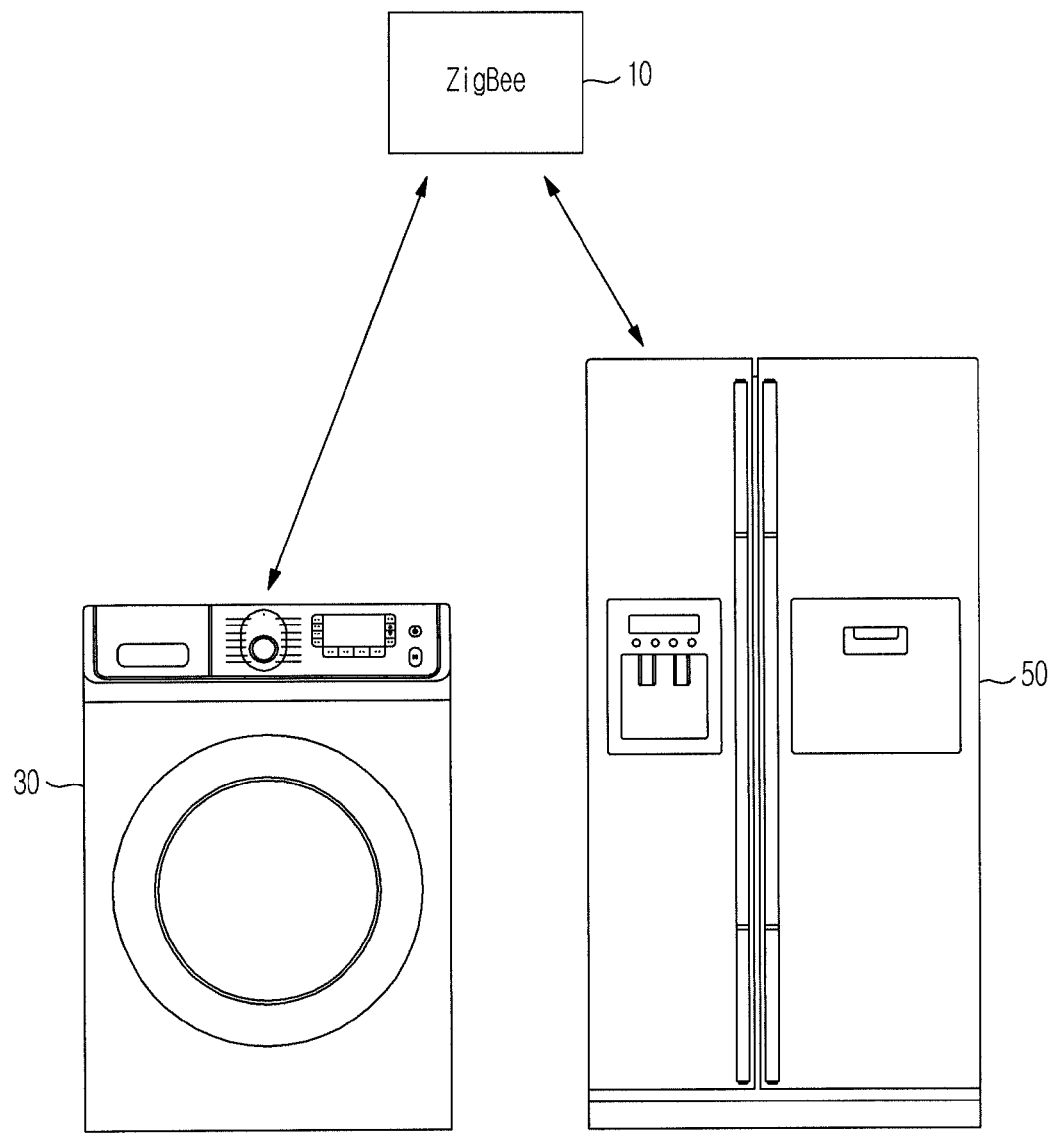
FIG. 7 is a view showing a product application example of FIG. 6.

FIG. 7 is a view showing a product application example of FIG. 6.

Referring to FIG. 7, an external modem using a ZigBee network is used as the modem 10 and a washing machine and refrigerator are used as the electric home appliances 30 and 50.

As shown in FIGS. 4 to 7, non-defective communication with the external service device may be necessary to construct a network to interconnect the modems 10 and 40 and the electric home appliances 30 and 50.

To this end, the network system according to the embodiment of the present disclosure creates a packet containing data and addresses to be transmitted, which will be described with reference to FIG. 8.

Figure 8:
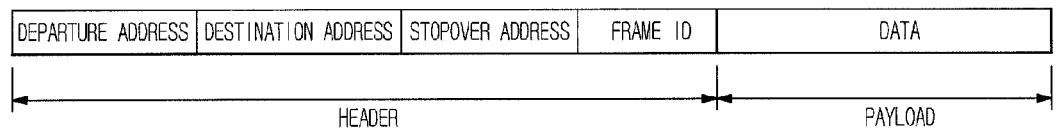
FIG. 8 is a view showing a communication data packet of the network system according to the embodiment of the present disclosure.

FIG. 8 is a view showing a communication data packet of the network system according to the embodiment of the present disclosure.

Referring to FIG. 8, the communication data packet contains a header having address information and a payload having data to be transmitted.

The header includes a departure address having information on a sender, a destination address having information on one or more destinations, a stopover address having information on one or more stopovers and a frame identification (ID).

The information on one or more destinations and the information on one or more stopovers include information on all electric home appliances 30 and 50 connected to a wireless network and specific product groups and serial numbers of the electric home appliances 30 and 50.

Also, the modems 10 and 40, connected to the electric home appliances 30 and 50, recognize and store kinds and serial numbers of the electric home appliances 30 and 50 and use the recognized kinds and serial numbers of the electric home appliances 30 and 50 to set an optimal communication channel.

In addition, the modems 10 and 40 have an arbitration function to prevent duplicate address allocation after being connected to the electric home appliances 30 and 50.

Also, the electric home appliances 30 and 50, connected to the modems 10 and 40, recognize and store kinds and serial numbers of the modems 10 and 40 and use the stored kinds and serial numbers of the modems 10 and 40 to set an optimal communication channel.

Hereinafter, the operation of the modem for the network system with the above-stated construction will be described.

Figure 9:
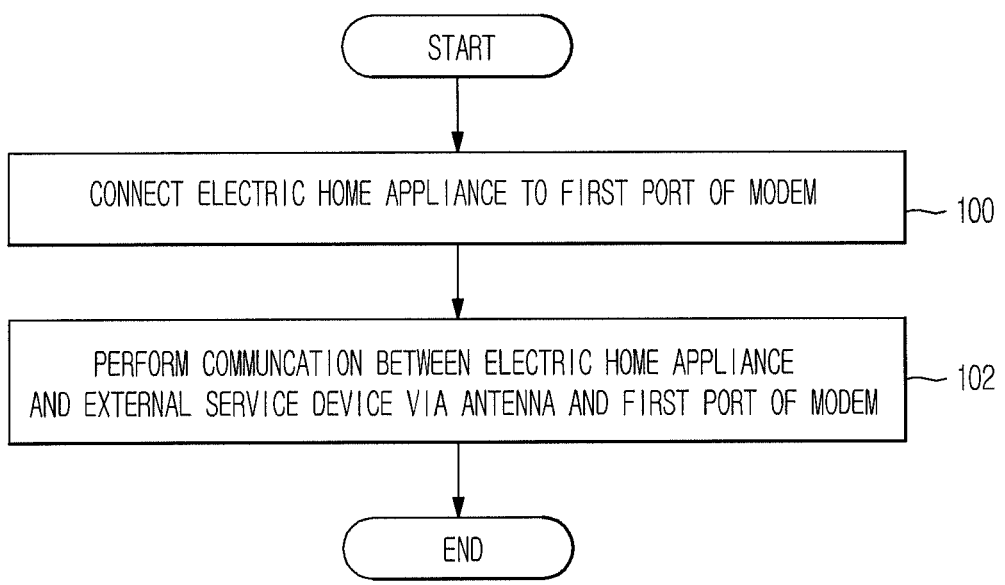
FIG. 9 is a flowchart showing a communication algorithm when an electric home appliance is connected to the modem for the network system according to the embodiment of the present disclosure.

FIG. 9 is a flowchart showing a communication algorithm when an electric home appliance is connected to the modem for the network system according to the embodiment of the present disclosure.

Referring to FIG. 9, an input port 32 of an electric home appliance 30 is connected to the first port 14 of the modem 10 (100).

When the electric home appliance 30 is connected to the first port 14 of the modem 10, data received from the external service device via the antenna 12 of the modem 10 is transmitted to the electric home appliance 30 via the first port 14 of the modem 10 and the input port 32 of the electric home appliance 30.

Subsequently, data processed by the electric home appliance 30 is transmitted to the controller 20 of the modem 10 via the input port 32 of the electric home appliance 30 and the first port 14 of the modem 10 and to the external service device via the antenna 12.

In this way, the modem 10 defines a communication channel in which data received from the external service device via the antenna 12 is transmitted to the electric home appliance 30 via the first port 14 of the modem 10 and data processed by the electric home appliance 30 is received via the first port 14 and transmitted to the external service device via the antenna 12, thereby achieving communication between the electric home appliance 30 and the external service device (102).

Figure 10:
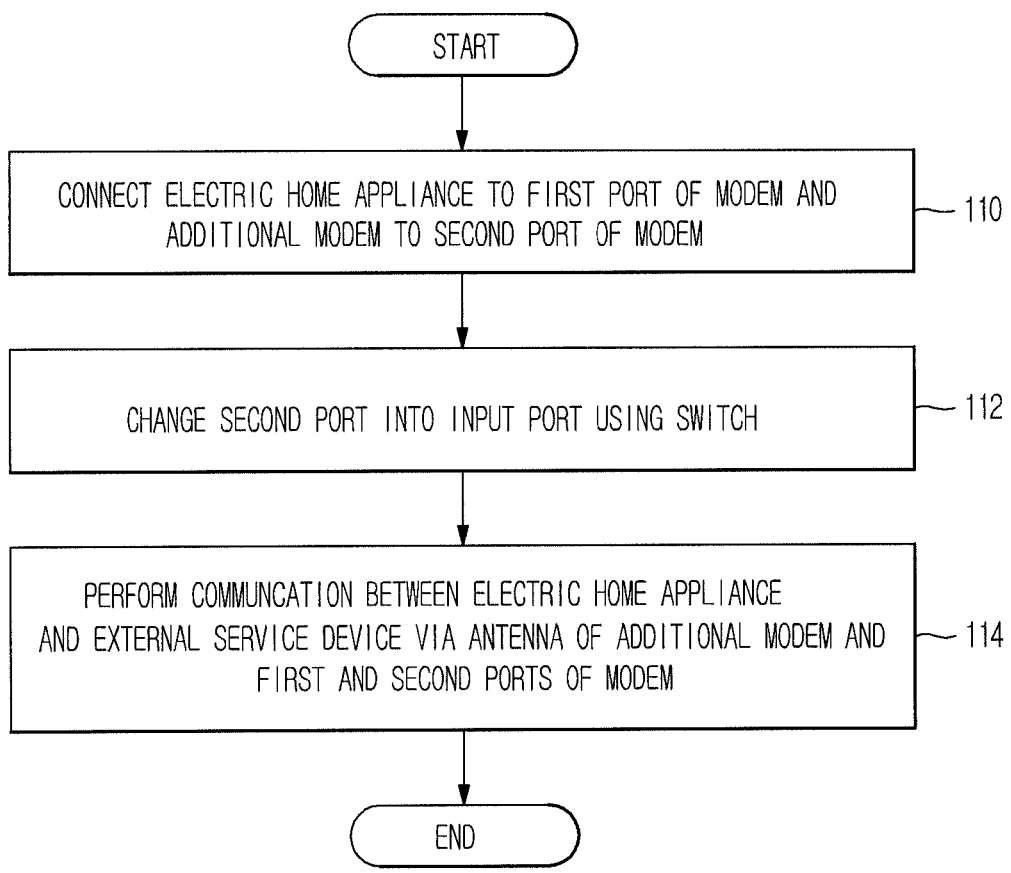
FIG. 10 is a flowchart showing a communication algorithm when an additional modem is connected to the modem for the network system according to the embodiment of the present disclosure.

FIG. 10 is a flowchart showing a communication algorithm when an additional modem is connected to the modem for the network system according to the embodiment of the present disclosure.

Referring to FIG. 10, the input port 32 of the electric home appliance 30 is connected to the first port 14 of the modem 10 and an output port 44 of an additional modem 40 is connected to the second port 16 of the modem 10 (110).

When the additional modem 40 is to be connected to the second port 16 of the modem 10, a user changes the function of the second port 16 into an input port using the switch 18 (112).

When the electric home appliance 30 is connected to the first port 14 of the modem 10 and the additional modem 40 is connected to the second port 16 of the modem 10, data received from the external service device via the antenna 42 of the additional modem 40 is transmitted to the electric home appliance 30, where the data is processed, via the output port 44 of the additional modem 40, the second port 16 of the modem 10, the first port 14 of the modem 10 and the input port 32 of the electric home appliance 30.

Subsequently, data processed by the electric home appliance 30 is transmitted to the additional modem 40 via the input port 32 of the electric home appliance 30, the first port 14 of the modem 10, the second port 16 of the modem 10 and the output port 44 of the additional modem 40 and to the external service device via the antenna 42 of the additional modem 40.

In this way, the modem 10 defines a communication channel in which data received from the external service device via the antenna 42 of the additional modem 40 is transmitted to the electric home appliance 30 via the output port 44 of the additional modem 40 and the second port 16 and first port 14 of the modem 10 and data processed by the electric home appliance 30 is received via the first port 14 and second port 16 of the modem 10 and the output port 44 of the additional modem 40 and transmitted to the external service device via the antenna 42 of the additional modem 40, thereby achieving communication between the electric home appliance 30 and the external service device (114).

Figure 11:
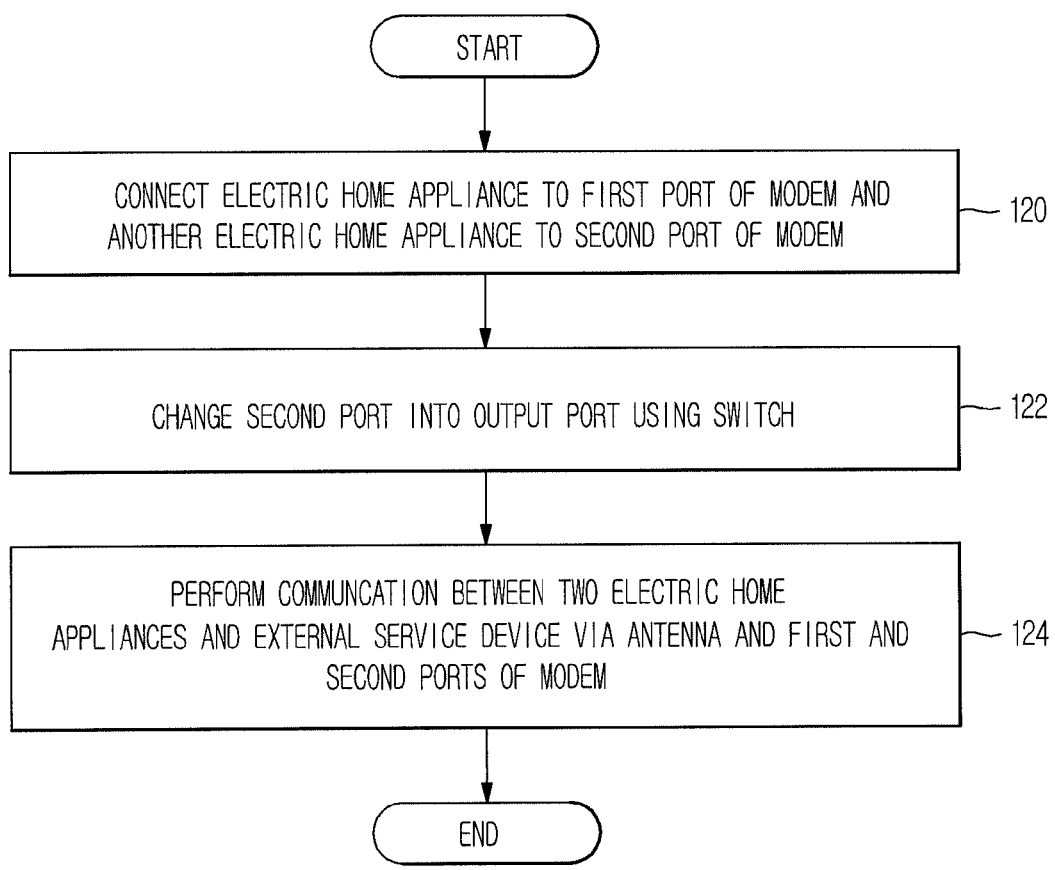
FIG. 11 is a flowchart showing a communication algorithm when one or more electric home appliances are connected to the modem for the network system according to the embodiment of the present disclosure.

FIG. 11 is a flowchart showing a communication algorithm when one or more electric home appliances are connected to the modem for the network system according to the embodiment of the present disclosure.

Referring to FIG. 11, the input port 32 of the electric home appliance 30 is connected to the first port 14 of the modem 10 and an input port 52 of another electric home appliance 50 is connected to the second port 16 of the modem 10 (120).

When the electric home appliance 50 is to be connected to the second port 16 of the modem 10, a user changes the function of the second port 16 into an output port using the switch 18 (122).

When the electric home appliance 30 is connected to the first port 14 of the modem 10 and the electric home appliance 50 is connected to the second port 16 of the modem 10, data received from the external service device via the antenna 12 is transmitted to the electric home appliance 30 via the first port 14 of the modem 10 and the input port 32 of the electric home appliance 30 and data received from the external service device via the antenna 12 is transmitted to the electric home appliance 50 via the second port 16 of the modem 10 and the input port 52 of the electric home appliance 50.

Subsequently, data processed by the electric home appliances 30 and 50 is transmitted to the controller 20 of the modem 10 via the input port 32 of the electric home appliance 30 and the first port 14 of the modem 10 and is transmitted to the controller 20 of the modem 10 via the input port 52 of the electric home appliance 50 and the second port 16 of the modem 10 and to the external service device via the antenna 12.

In this way, the modem 10 defines a communication channel in which data received from the external service device via the antenna 12 is transmitted to the electric home appliances 30 and 50 via the first port 14 and the second port 16 and data processed by the electric home appliances 30 and 50 is received via the first port 14 and the second port 16 and transmitted to the external service device via the antenna 12, thereby achieving communication between the electric home appliance 30 and the external service device (124).

As is apparent from the above description, when two modems using the same interface are connected to an electric home appliance, connection of the modems to the electric home appliance is easily achieved via the existing ports without adding a new input/output interface to the electric home appliance. Also, when one or more electric home appliances jointly use a modem, additional connection of the electric home appliances is achieved using a switch without using an additional distributor, whereby a user may conveniently achieve additional connection of the modems and electric home appliances.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A modem for a network system, comprising:
an antenna to wirelessly transmit data and receive data from an external service device;
a plurality of input/output ports to selectively function as one of an input port and output port, wherein the input port is adapted to communicate with an additional modem and the output port is adapted to communicate with an electric home appliance;
a switch to selectively change the function of the input/output ports so that the input/output ports function as the one of the input port and output port; and
a controller to control the modem such that the electric home appliance communicates with the external service device using a communication channel, the antenna and the input/output ports.

2. The modem according to claim 1, wherein a first port, of the plurality of input/output ports, is connected to an electric home appliance and communicates with the external service device.

3. The modem according to claim 2, wherein the input/output ports comprise the first port, which is an exclusive output port, and a second port, which is changed into an input or output port by the switch.

4. The modem according to claim 3, wherein the first port is connected to the electric home appliance to define a communication channel between the electric home appliance and the external service device.

5. The modem according to claim 2, wherein the second port is connected to the additional modem and functions as an output port, wherein the additional modem communicates with the electric home appliance via the first port and the second port of the modem, and wherein the additional modem communicates, data received from the electric home appliance, with the external service device via an antenna of the additional modem.

6. The modem according to claim 1, wherein the modem is connected to an additional modem, wherein the additional modem communicates with the external service device.

7. The modem according to claim 6, wherein the input/output ports comprise a first port, which is an exclusive output port, and a second port, which is changed into an input or output port by the switch.

8. The modem according to claim 7, wherein the second port is connected to the one or more electric home appliances to define a communication channel between the one or more electric home appliances and the external service device.

9. The modem according to claim 8, wherein the switch changes a function of the second port into an output port when the second port is connected to the one or more electric home appliances.

10. The modem according to claim 6, wherein the modem is connected to the one or more electric home appliances.

11. The modem according to claim 1, wherein the modem is connected to two or more electric home appliances and communicates with the external service device.

12. The modem according to claim 11, wherein the input/output ports comprise a first port, which is an exclusive output port, and a second port, which is changed into an input or output port by the switch.

13. The modem according to claim 12, wherein the second port is connected to the additional modem to define a communication channel between the additional modem and the external service device.

14. The modem according to claim 13, wherein the switch changes a function of the second port into an input port when the second port is connected to the additional modem.

15. The modem according to claim 11, wherein the modem is connected to the additional modem.

16. The modem according to claim 1, wherein the modem communicates with the external service device via a wireless network including a ZigBee network, a WiFi network, a Bluetooth network or a mobile network.

17. An operating method of a modem mounted in one or more electric home appliances connected to a wireless network to communicate with an external service device, comprising:
   communicating with the external service device via a plurality of input/output ports to function as an input port, to communicate with an additional modem, or an output port, to communicate with an electric home appliance;
   changing functions of the input/output ports so that the input/output ports function as the input or output port; and
   communicating with the external service device using a communication channel, connected to the input/output ports when the functions of the input/output ports are changed.

18. The operating method according to claim 17, wherein the modem is connected to the one or more electric home appliances or an additional modem.

19. The operating method according to claim 18, wherein the modem creates a communication data packet containing information on one or more destinations, information on one or more stopovers and information on a sender when the modem is connected to the one or more electric home appliances.

20. The operating method according to claim 19, wherein the information on one or more destinations and the information on one or more stopovers comprises information on all electric home appliances and specific electric home appliances or predetermined essential electric home appliances.

21. The operating method according to claim 18, wherein the modem, connected to the one or more electric home appliances, recognizes kinds and serial numbers of the electric home appliances and uses the recognized information to set the communication channel.

22. The operating method according to claim 18, wherein the one or more electric home appliances, connected to the modem, recognize a kind and serial number of the modem and use the recognized information to set the communication channel.

23. A modem for a network system, comprising:
   an antenna to wirelessly transmit and receive data;
   a plurality of input/output ports to selectively function as one of an input port and an output port, where the input port is adapted to communicate with an additional modem and the output port is adapted to communicate with an electric home appliance, and where the modem is adapted to communicate with an external service device via the antenna or one of the plurality of input/output ports that selectively functions as the input port;
   a switch to selectively change the function of at least one of the plurality of input/output ports from the function of the input port to the function of the output port; and
   a controller to control the modem to communicate with the external service device using a communication channel.

* * * * *